Patented May 2, 1939

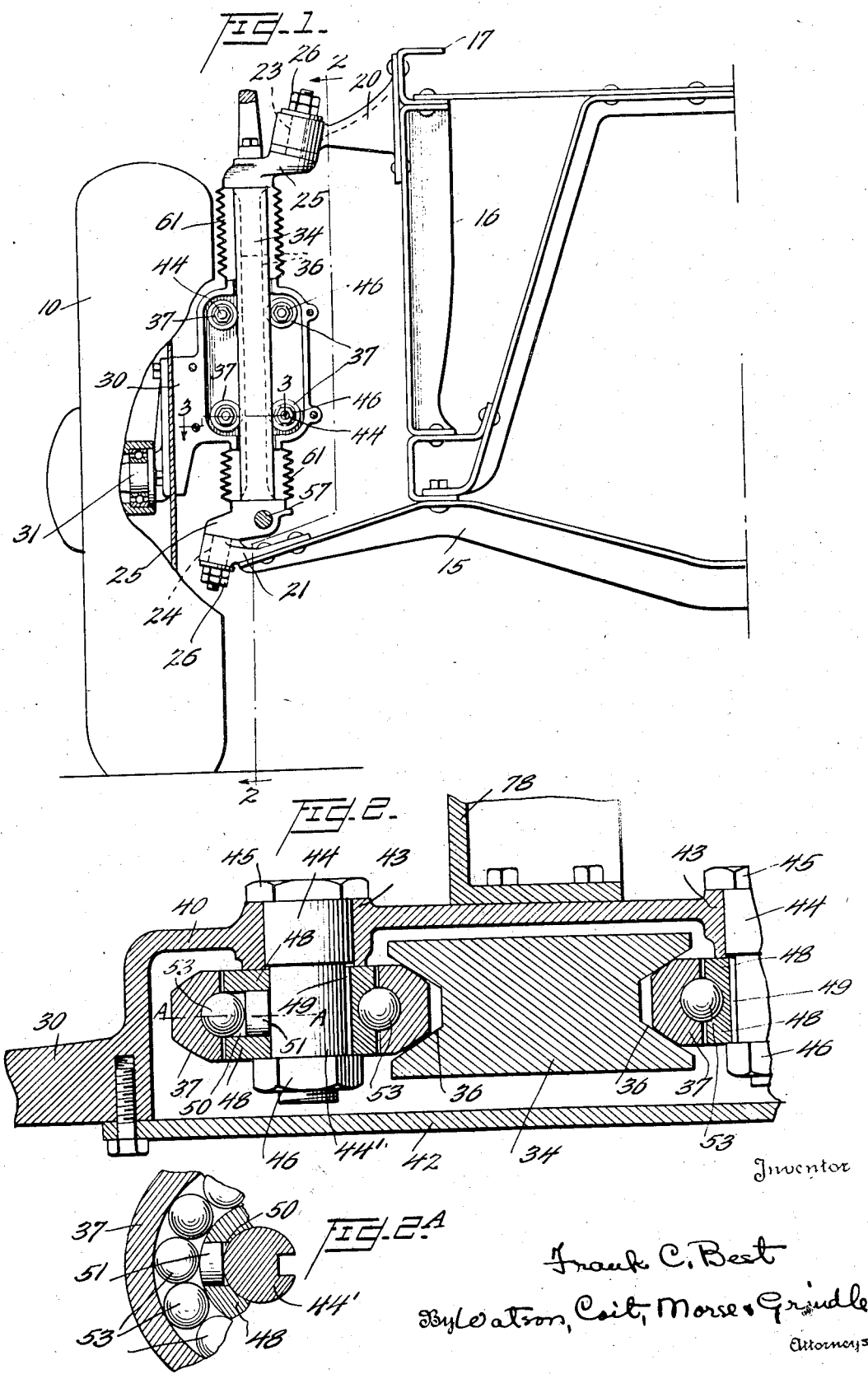

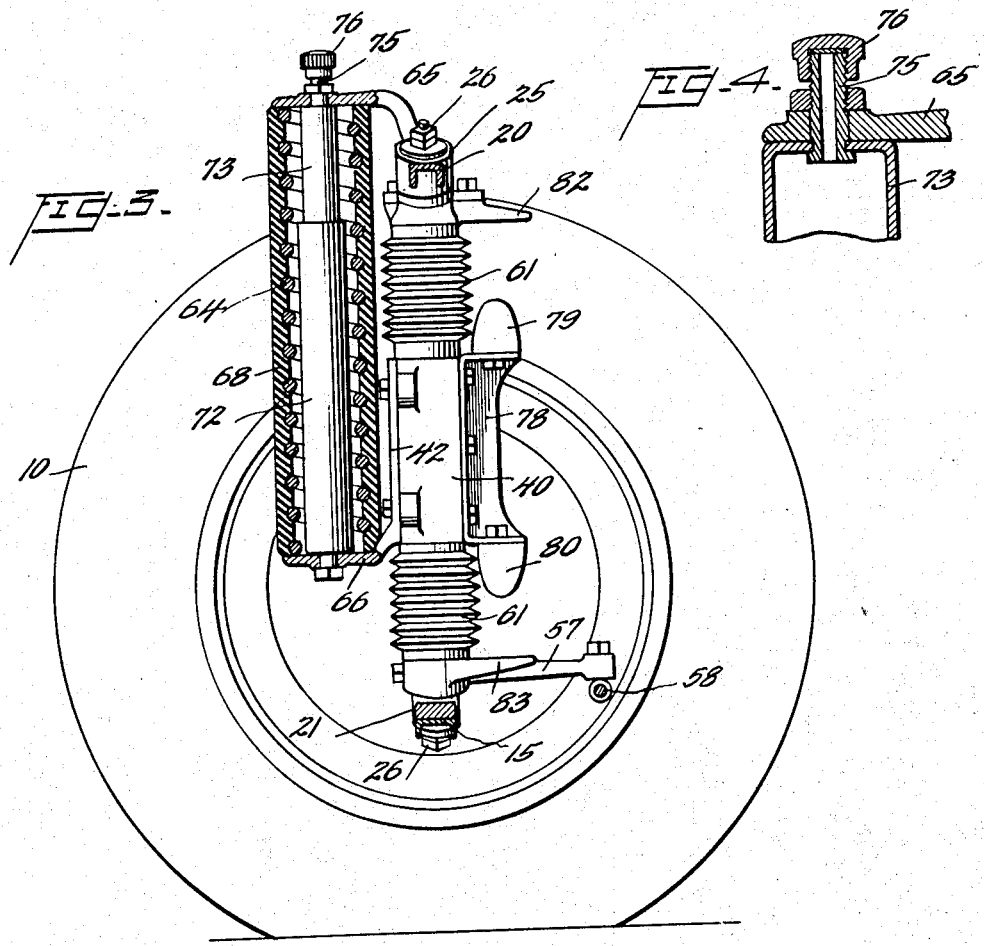
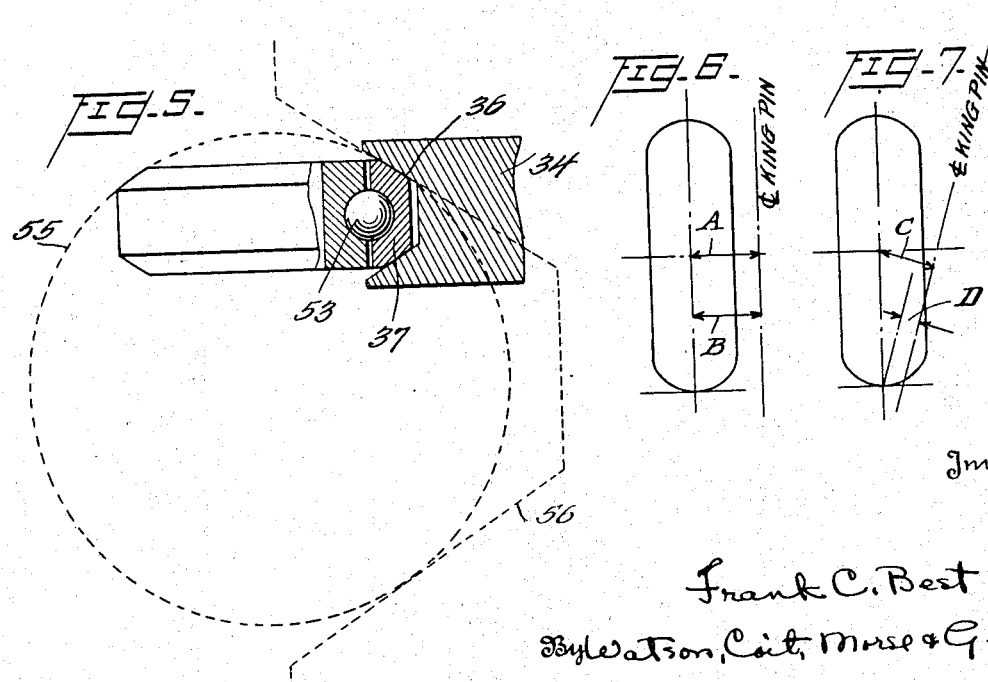

2,156,580

UNITED STATES PATENT OFFICE 2,156,580

MOTOR VEHICLE

Frank C. Best, Detroit, Mich., assignor to Packard Motor Car Company, Detroit, Mich., a corporation of Michigan Application July 17, 1936, Serial No. 91,229

14 Claims. (Cl. 280—96.2)

This invention relates to wheel suspensions for motor vehicles and has for its principal object the provision of a wheel suspension structure which may be cheaply and readily manufactured, which is sturdy and efficient in operation, and which occupies a minimum of space when assembled with the vehicle.

The principles of the invention are particularly applicable to steerable road wheels, but a number of features are useful in connection with non-steerable wheels and with either driving or non-driving wheels. For the purpose of illustrating the invention, the application thereof to a steerable non-driving road wheel has been selected, the suspension being readily accommodated to conventional forms of steering mechanism.

In accordance with the present invention, each road wheel is supported on the vehicle frame for rising and falling movement on a frame carried guide member and in the case of the steerable road wheel illustrated herein this guide member is supported on the frame for swinging steering movement so that all of the elements of the steering mechanism may be mounted on the frame and will thus partake of no relative displacement as the wheel rises and falls in passing over an irregular road bed. It is a feature of the invention that the friction developed as the result of relative movement of the cooperating elements as the wheel rises and falls is reduced to a minimum while the stresses applied to the suspension are adequately resisted without the employment of structural members of excessive weight and size.

Thus in the preferred embodiment of the invention a frame carried member and a wheel supporting member are connected for relative bodily displacement in a generally vertical direction, the connection including a plurality of rollers carried by one of said members and engaging roller tracks in the other member. The rollers are preferably supported on anti-friction bearings which are adjustable toward the roller tracks so that the contact pressure exerted by the rollers on the tracks may be regulated and the bearing preloaded to eliminate play.

It is a further object of the invention to provide a wheel suspension of the general character described in which rising and falling movement of the road wheel is yieldingly resisted by means of a coil spring of which the convolutions are embedded in rubber or the like. Preferably a shock absorber unit is mounted within the spring and the rubber performs the dual function of supporting the spring and aiding in the damping of vibrational disturbances in the system and of encasing the shock absorber unit so as to exclude foreign matter therefrom.

It is also a feature of the invention to position the spring member ahead of the center line of the axle or of the supporting bearings. This has the desirable effect of additionally preloading the bearings of the suspension, so that if any play should exist therein, horizontal impacts or brake application stresses will only tend to increase the preloading of the bearings and thus eliminate rattling or pounding.

Another feature of the novel wheel suspension is the relatively wide separation of the king pin bearings, which results in a considerable reduction of the load on these bearings and prolongs their life.

Further objects and features of the invention will be apparent from the following description taken in connection with the accompanying drawings, in which Figure 1 is a front elevation, partly in section, of a wheel suspension illustrating the application of the principles of the invention;

Figure 2 is a fragmentary sectional view taken substantially on the line 2—2 of Figure 1;

Figure 2A is a fragmentary sectional view of the ball bearing roller taken on line A—A of Figure 2;

Figure 3 is a vertical sectional view taken substantially on the line 3—3 of Figure 1;

Figure 4 is an enlarged detailed sectional view of a portion of the structure shown in Figure 3;

Figure 5 is a diagrammatic view of certain of the elements shown in Figure 2 illustrating the effectiveness of these elements in operation; and Figures 6 and 7 are diagrammatic views comparing the resistance to forces developed during operation of the vehicle by the suspension shown herein and by more conventional types of suspension.

In order to facilitate an understanding of the invention, reference is made to the embodiment thereof illustrated in the drawing and specific language is employed. It will nevertheless be understood that no limitation of the scope of the invention is thereby intended but that various modifications and alterations of this structure are contemplated. For example, from the illustration of the application of the invention to steerable road wheels of the non-driving type, the manner in which the invention may be employed with driving and non-steerable road wheels will be readily apparent, and it is not intended that the invention shall be construed as limited except to the extent hereinafter specifically pointed out in the appended claims.

Referring now to Figure 1 of the drawings, it will be observed that the road wheel 10 is illustrated as supported near the forward end of the vehicle frame, only one of the two oppositely disposed wheels and the associated supporting means being shown. The details of the frame form no essential part of the instant invention and may be described briefly as comprising a transversely extending frame member 15, an upright member 16 and a longitudinally extending member 17. A bracket 20 is secured to the members 16 and 17 adjacent the upper end of the former and a bracket 21 is secured to the outer end of the transverse member 15, these brackets forming the stationary part of a steering knuckle or the equivalent thereof. Thus each of the brackets 20 and 21 is formed to provide an apertured boss, these bosses respectively receiving studs 23 and 24 formed on or secured to a member 25, the studs being retained in position in the bosses by nuts 26 which are threaded on the studs. The member 25 is thus mounted for swinging steering movement on the frame about a generally upstanding axis, it being appreciated that the axis will be so chosen as to afford approximately the desired wheel caster and is preferably substantially inclined with respect to the vertical in a transverse plane for the purpose of improving the resistance to braking effort as hereinafter more fully explained.

The road wheel 10 is carried on a wheel supporting member 30, for instance by means of the usual wheel spindle 31 which is secured to or formed integral with the member 30, the specific manner in which the wheel is mounted being conventional and constituting no essential part of the present invention. The member 30 and the member 25 are connected for relative, generally vertical, bodily displacement, preferably by the means illustrated in more detail in Figure 2 of the drawings.

Thus that portion of the member 25 intermediate the points of connection thereof to the vehicle frame may be formed to provide an elongated guide or rail 34, this rail having formed therein a plurality of longitudinally directed grooves or roller tracks 36 in which are received and confined a plurality of rollers 37, the latter being supported for rotation on the member 30. In order to simplify the illustration the rail 34 is shown as provided with only two roller tracks 36, and this number should ordinarily suffice for the adequate resistance of forces tending to effect relative displacement of the members 25 and 30 in a horizontal direction, but it will be obvious that a greater number of tracks and rollers than are shown herein may be provided. For example, the rail 34 may be constructed to afford three roller tracks, in which event these tracks would ordinarily be disposed about the rail 34 at substantially equal angular intervals, it being advisable only to ensure that any radial thrust applied by the rollers to the rail be properly balanced by suitable disposition of the rollers and tracks.

The member 30 is shown in Figure 2 as being formed to provide a housing portion 40 of generally rectangular section as viewed in vertical and horizontal planes, the housing 40 being closed by means of a cover plate 42 which is secured thereto and which may afford a support for further mechanism hereinafter described. The housing 40 is further provided at its rear side with a plurality of bosses 43 in which are received studs 44 having heads 45 accessible from the exterior of the housing, each stud 44 being threaded adjacent its opposite end for the reception of a nut 46. A bearing hub 48 is seated on and keyed to the eccentric portions 44' of each stud 44 as indicated at 49. A roller 37 surrounds each hub 48 and anti-friction balls 53 or the like are interposed between the races formed by annular grooves in the interior of the associated roller 37 and in the outer periphery of the hub 48, whereby the rollers may be freely rotated on the studs 44 and are positioned for rolling engagement with the roller tracks 36 of the rail 34.

Means for the insertion of the balls 53 in the races between the members 48 and 37 are clearly indicated in Figures 2 and 2A of the drawings. A radial opening 50 is provided in the hub or inner race member 48 through which the balls are adapted to be passed from the interior of the hub. After the balls are inserted, the opening 50 is closed by means of the plug 51. It will be observed that the plug 51 is disposed substantially oppositely to the point of contact of the roller with the guide rail and so carries no direct load from the ball bearings.

No separators need be used in this construction and the resulting greater number of balls employed gives a greater load carrying capacity.

Each roller 37 is preferably provided with convexly curved lateral track-engaging faces, whereby a small area of contact between these faces and the cooperating walls of the tracks 36 may be assured. The tracks 36 are tapered radially of the rollers to provide substantial wedging action between the rollers and the tracks, and the rollers may be readily adjusted to increase the degree of pressure therebetween by rotation of the studs 44, the eccentric portion 44' of the studs and the eccentricity of the hub 48 displacing the rollers radially.

In adjusting the camber of the wheels the four eccentric studs 44 are turned back and forth until the desired camber has been obtained. Each stud is then given an extra rotation of predetermined extent in order to ensure the preloading of the entire assembly. Further slight turning of the studs from time to time will compensate for any wear which might occur.

Referring now to Figure 5, it will be observed that each roller 37 is the equivalent in function of a ball of very large diameter. Thus the equivalent ball is indicated in dotted lines at 55 and a track capable of receiving this ball is indicated at 56. The size of the equivalent ball 55 may be readily determined in any given instance by erecting a perpendicular to the wall of the roller track 36 at the point of engagement of the associated roller 37 therewith and describing a circle passing through diametrically opposite points of one face of the roller 37 having its center disposed on this perpendicular line. It will thus be apparent that the resistance offered by the cooperating roller and track to relative horizontal displacement of the members 25 and 30 is very much higher than that which would be afforded by a ball and groove connection of comparable size between these members. It will furthermore be appreciated that by reason of the employment of an anti-friction device between each roller and its support, the resistance offered to rising and falling movement of the road wheel by the connection is reduced to a minimum and the wheel thus responds much more readily as the vehicle is driven over an irregular road bed.

Figure 6 illustrates diagrammatically the leverage of the forces tending to cause rotation of the road wheel about its steering axis during operation of the vehicle in suspensions of the type employing a king pin or the like which is slidable in the steering axis, it being necessary to employ a substantially vertical steering axis in order that the wheel may rise and fall vertically. Thus the force moment on impact of the wheel with an obstruction is indicated at A and the moment effective when the brakes are applied to the road wheel is indicated at B, these moments being equal. In Figure 7, which is a diagrammatic representation of the instant structure, it will be observed that while the impact moment indicated at C is only slightly less than that which obtains with more conventional types of suspension, the braking moment D has been reduced materially by reason of the fact that the center line of the king pin may be inclined downwardly and outwardly so as to intersect the road bed at a point which is closely adjacent to the median plane of the wheel and may even coincide with the point of contact of the central portion of the wheel tread with the road bed, thereby reducing the braking moment to zero. As the result of this arrangement the forces acting on the road wheel and tending to displace the steering column and rotate the steering hand wheel are greatly reduced and easier steering is secured.

As hereinbefore explained, the steering mechanism may be of any conventional type and the full details thereof are not shown in the drawings. Such mechanism may comprise, for example, the usual steering link 58 which is pivotally connected between steering arms 57, one such arm being secured to the member 25 at each side of the vehicle, so that the wheels are connected for conjoint steering movement, a conventional drag link or the like being connected to one or the other of the steering arms 57. Since the steering arms and linkage and the king pin bearings to which they are connected remain in a fixed position vertically regardless of the vertical wheel movement, there can be no interference with perfect steering control.

The housing 40 is open at its upper and lower sides to permit passage of the rail 34 therethrough, and dust may be excluded from the interior of the housing by telescoping dust shields or boots 61 which are secured at their opposite ends to the member 25 and to the housing.

Rising movement of the road wheel is yieldingly resisted by means of a coil spring 64, the latter acting under compression between the members 25 and 30. Thus a member 65 may be secured to the member 25 adjacent the upper end of the latter and the cover plate 42 may be provided with an extended portion affording a cooperating member 66 adjacent the lower end of the housing 40, the spring 64 being interposed between the members 65 and 66. Preferably the spring 64 is embedded in a sheath 68 of rubber or other imperfectly elastic, deformable material, this material serving as a support and housing for the spring, increasing the resistance to flexure of the latter, and serving to damp vibrations and prevent surging of the spring; compression of the rubber resulting in the dissipation of vibrational energy in the form of heat due to the internal hysteresis of the rubber. At its upper and lower ends the sheath 68 may be vulcanized or otherwise surface bonded to the members 65 and 66 to completely seal the spring.

Preferably shock absorbing mechanism is disposed within the spring and is completely protected by the rubber sheath and associated member. This shock absorbing mechanism may be of conventional construction including a cylinder 72 and a piston having a stem 73, suitable means being associated with the piston for restricting flow of fluid from one side to the other thereof on the occurrence of displacement of the piston within the cylinder. The fluid system comprised by the piston and cylinder may be filled through a tube 75 normally closed by a cap 76 threaded thereon, this tube extending through the member 65 and having the lower end thereof extending through and spun over the upper end of the piston stem 73. Preferably the entire system is completely filled with fluid to prevent the formation of an emulsion with air, but the details of this shock absorbing mechanism form no essential part of the present invention and may be modified as desired. It will be understood that the term "shock absorber" as employed herein is intended to comprise any device acting to resist sudden and rapid accelerative movement of the road wheel with respect to the vehicle frame while offering much less resistance to gradual or slow relative displacement thereof. The shock absorber mechanism being of the elongated tubular form disclosed herein and fitting fairly snugly within the spring 64 serves the further purpose of centering and guiding the spring and preventing its distortion in any horizontal direction.

Secured to the rear side of the housing 40 is a bracket 78 to the upper and lower side of which are secured cushion members 79 and 80 of rubber or other suitable material, these cushion members cooperating respectively with abutments 82 and 83 secured to or formed on the member 25. Thus extreme displacement of the road wheel with respect to the frame in either an upward or a downward direction is limited by engagement of the cushions with the respective abutments.

It will be appreciated that the construction illustrated herein is characterized by extreme sturdiness and compactness. The member 25 is connected with the frame above and below the point of connection of this member with the wheel supporting member 30 and at widely spaced points so as to adequately resist braking torque and other stresses applied to the road wheel during operation. The unsprung weight consists only of the road wheel assembly, the wheel supporting member 30, and the associated elements of the connection with the member 25 and may thus be maintained quite low, particularly since the close proximity of the supporting members to the road wheel reduces the leverage of impact forces to a minimum and permits the employment of structural parts of unusually low weight.

Having thus described the invention, what is claimed as new and desired to be secured by Letters Patent is:

1. In a motor vehicle, the combination with the vehicle frame and steerable road wheels disposed at opposite sides thereof, of means supporting each of said wheels on said frame for rising and falling movement and for steering movement with respect thereto, said means including a member carrying the wheel, a member supported on said frame for swinging steering movement about an upstanding axis, and a connection between said members affording relative displacement thereof in a generally vertical direction and restraining relative horizontal displacement thereof, said connection including a plurality of rollers supported by one of said members, the other of said members being constructed to provide roller tracks in which said rollers are confined, each of said rollers and the cooperating track member being constructed to afford interlocking portions preventing relative movement thereof about the upstanding axis.

2. In a motor vehicle, the combination with the vehicle frame and steerable road wheels disposed at opposite sides thereof, of means supporting each of said wheels on said frame for rising and falling movement and for steering movement with respect thereto, said means including a member carrying the wheel, a member supported on said frame for swinging steering movement about an upstanding axis, and a connection between said members affording relative displacement thereof in a generally vertical direction and restraining relative horizontal displacement thereof, said connection including a plurality of rollers supported by one of said members, the other of said members being constructed to provide roller tracks in which said rollers are confined, each of said rollers and the cooperating track member being constructed to afford interlocking portions preventing relative movement thereof about the upstanding axis, and anti-friction means supporting said rollers for rotation on the associated member.

3. In a motor vehicle, the combination with the vehicle frame and steerable road wheels disposed at opposite sides thereof, of means supporting each of said wheels on said frame for rising and falling movement and for steering movement with respect thereto, said means including a member carrying the wheel, a member supported on said frame for swinging steering movement about an upstanding axis, a connection between said members affording relative displacement thereof in a generally vertical direction and restraining relative horizontal displacement thereof, said connection including a plurality of rollers supported by one of said members, the other of said members being constructed to provide roller tracks in which said rollers are confined, each of said rollers and the cooperating track member being constructed to afford interlocking portions preventing relative movement thereof about the upstanding axis, and means supporting said rollers on the associated member for radial adjustment, whereby the degree of contact pressure between said rollers and the cooperating tracks may be regulated.

4. In a motor vehicle, the combination with the vehicle frame and steerable road wheels disposed at opposite sides thereof, of means supporting each of said wheels on said frame for rising and falling movement and for steering movement with respect thereto, said means including a member carrying the wheel, a member supported on said frame for swinging steering movement about an upstanding axis, and a connection between said members affording relative displacement thereof in a generally vertical direction and restraining relative horizontal displacement thereof, said connection including a plurality of pairs of rollers carried by one of said members, the rollers of each pair being disposed at opposite sides of the other of said members, the other of said members being constructed to provide roller tracks in which said rollers are confined, each of said rollers and the cooperating track member being constructed to afford interlocking portions preventing relative movement thereof about the upstanding axis.

5. In a motor vehicle, the combination with the vehicle frame and steerable road wheels disposed at opposite sides thereof, of means supporting each of said wheels on said frame for rising and falling movement and for steering movement with respect thereto, said means including a member carrying the wheel, a member supported on said frame for swinging steering movement about an upstanding axis, and a connection between said members affording relative displacement thereof in a generally vertical direction and restraining relative horizontal displacement thereof, said connection including a plurality of rollers supported by one of said members, the other of said members being constructed to provide roller tracks in which said rollers are confined, each of said rollers and the cooperating track member being constructed to afford interlocking portions preventing relative movement thereof about the upstanding axis, said rollers and tracks being so disposed as to apply a balanced radial thrust on the other of said members.

6. In a motor vehicle, the combination with the vehicle frame and steerable road wheels disposed at opposite sides thereof, of means supporting each of said wheels on said frame for rising and falling movement and for steering movement with respect thereto, said means including a member carrying the wheel, a member supported on said frame for swinging steering movement about an upstanding axis, and a connection between said members affording relative displacement thereof in a generally vertical direction and restraining relative horizontal displacement thereof, said connection including a plurality of rollers supported by one of said members, the other of said members being constructed to provide roller tracks in which said rollers are confined, each of said rollers and the cooperating track member being constructed to afford interlocking portions preventing relative movement thereof about the upstanding axis, said rollers and tracks being so disposed as to apply a balanced radial thrust on the other of said members, and means for adjusting said rollers radially on the member supporting the same.

7. In a motor vehicle, the combination with the vehicle frame and steerable road wheels disposed at opposite sides thereof, of means supporting each of said wheels on said frame for rising and falling movement and for steering movement with respect thereto, said means including a member carrying the wheel, a member supported on said frame for swinging steering movement about an upstanding axis, and a connection between said members affording relative displacement thereof in a generally vertical direction and restraining relative horizontal displacement therof, said connection including a plurality of rollers supported by one of said members, the other of said members being constructed to provide roller tracks in which said rollers are confined, said tracks being tapered to afford wedging engagement with said rollers, and means for adjusting said rollers radially on said supporting member to increase such wedging engagement.

8. In a motor vehicle, the combination with the vehicle frame and steerable road wheels disposed at opposite sides thereof, of means supporting each of said wheels on said frame for rising and falling movement with respect thereto, said means including a member carrying the wheel, a member supported on said frame at spaced points for swinging steering movement about an upstanding axis, and a connection between said members intermediate said spaced points affording relative displacement of said members in a generally vertical direction and restraining relative horizontal displacement thereof, said connection including anti-friction rollers supported on one of said members, the other of said members being constructed to provide roller tracks in which said rollers are confined, each of said rollers and the cooperating track member being constructed to afford interlocking portions preventing relative movement thereof about the upstanding axis.

9. In a motor vehicle, the combination with the vehicle frame and steerable road wheels disposed at opposite sides thereof, of means supporting each of said wheels on said frame for rising and falling movement with respect thereto, said means including a member carrying the wheel, a member supported on said frame at spaced points for swinging steering movement about an upstanding axis, and a connection between said members intermediate said spaced points affording relative displacement of said members in a generally vertical direction and restraining relative horizontal displacement thereof, said connection including anti-friction rollers supported on one of said members, the other of said members being constructed to provide roller tracks in which said rollers are confined, each of said rollers and the cooperating track member being constructed to afford interlocking portions preventing relative movement thereof about the upstanding axis, and means for effecting adjustment of said rollers on the supporting member toward said roller tracks.

10. In a motor vehicle, the combination with the vehicle frame and road wheels disposed at opposite sides thereof, of means supporting each of said wheels on said frame for rising and falling movement with respect thereto, said means including a member carrying the wheel, a member supported on said frame, and a connection between said members affording relative displacement thereof in a generally vertical direction and restraining relative horizontal displacement thereof, said connection including a plurality of rollers supported by one of said members, the other of said members being constructed to provide roller tracks in which said rollers are confined, each of said rollers and the cooperating member being constructed to afford interlocking portions preventing relative horizontal displacement thereof.

11. In a motor vehicle, the combination with the vehicle frame and road wheels disposed at opposite sides thereof, of means supporting each of said wheels on said frame for rising and falling movement with respect thereto, said means including a member carrying the wheel, a member supported on said frame, and a connection between said members affording relative displacement thereof in a generally vertical direction and restraining relative horizontal displacement thereof, said connection including a plurality of rollers supported by one of said members, the other of said members being constructed to provide roller tracks in which said rollers are confined, each of said rollers and the cooperating member being constructed to afford interlocking portions preventing relative horizontal displacement thereof, and means supporting said rollers on the associated member for radial adjustment, whereby the degree of contact pressure between said rollers and the cooperating tracks may be regulated.

12. In a motor vehicle, the combination with the vehicle frame and road wheels disposed at opposite sides thereof, of means supporting each of said wheels on said frame for rising and falling movement with respect thereto, said means including a member carrying the wheel, a member supported on said frame, and a connection between said members affording relative displacement thereof in a generally vertical direction and restraining relative horizontal displacement thereof, said connection including a plurality of rollers supported by one of said members, the other of said members being constructed to provide roller tracks in which said rollers are confined, said tracks being tapered to afford wedging engagement with said rollers, and means for adjusting said rollers radially on said supporting member to increase such wedging engagement.

13. In a motor vehicle, the combination with the vehicle frame and road wheels disposed at opposite sides thereof, of means supporting each of said wheels on said frame for rising and falling movement with respect thereto, said means including a member carrying the wheel, a member supported on said frame, and a bearing connection between said members affording relative displacement thereof in a generally vertical direction and restraining relative horizontal displacement thereof, and a yielding connection between said wheel carrying member and frame acting on said member at a point forward of said bearing connection, said yielding connection thus serving to yieldingly resist rising movement of said wheel and also to preload the bearing connection.

14. In a motor vehicle, the combination with the vehicle frame and road wheels disposed at opposite sides thereof, of means supporting each of said wheels on said frame for rising and falling movement with respect thereto, said means including a member carrying the wheel, a member supported on said frame, and a bearing connection between said members affording relative displacement thereof in a generally vertical direction and restraining relative horizontal displacement thereof, said connection including a plurality of rollers supported by one of said members, the other of said members being constructed to provide roller tracks in which said rollers are confined, each of said rollers and the cooperating member being constructed to afford interlocking portions preventing relative horizontal displacement thereof, and a yielding connection between said wheel carrying member and frame acting on said member at a point forward of said bearing connection, said yielding connection thus serving to yieldingly resist rising movement of said wheel and also to preload the bearing connection.

FRANK C. BEST.